United States Patent
Coffey et al.

[11] Patent Number: 6,097,481
[45] Date of Patent: Aug. 1, 2000

[54] BANG-BANG LASER SPOT TRACKER

[75] Inventors: David W. Coffey, Westminster; Martin G. Woolfson, Baltimore, both of Md.

[73] Assignee: Northrop Grumman Corporation, Los Angeles, Calif.

[21] Appl. No.: 05/668,030

[22] Filed: Mar. 18, 1976

[51] Int. Cl.[7] .............................. G01B 11/26; G01C 1/00; F41G 7/00
[52] U.S. Cl. ................. 356/139.7; 244/3.16; 250/203.2; 356/139.05; 356/139.06
[58] Field of Search ........................ 356/28, 152, 139.05, 356/139.06, 139.07; 250/203 R, 203.2; 244/3.16; 235/150.27; 178/DIG. 21; 343/117 R, 7.4

[56] References Cited

U.S. PATENT DOCUMENTS

| | | | |
|---|---|---|---|
| 3,469,081 | 9/1969 | Lattmann | 343/7.4 |
| 3,644,043 | 2/1972 | Jones et al. | 250/203 R |
| 3,793,634 | 2/1974 | Heller et al. | 343/7.4 |
| 3,842,420 | 10/1974 | Rabow | 343/117 R |

Primary Examiner—Stephen C. Buczinski

[57] ABSTRACT

A "bang-bang", i.e. digital tracking system for a remote laser designated target having position, rate and acceleration errors. The system is responsive to the sign of the error signal (up/down, right/left) in relation to boresight as opposed to the amplitude of the received signal output from an optical quadrature detector to determine the occurrence of two consecutive zero crossings of boresight following a system gain change where there is a change in sign for consecutive signal detections and as a result thereof reduces the size or amplitude of the digital control step which is utilized to determine the limit cycle of the oscillation of the tracker's optics. Additionally, an estimate of the velocity error is determined from the number of signal detections between successive zero crossings, i.e. from up to down, or vice versa, and left to right, or vice versa and summed with the control step to provide a composite tracking error signal which is applied to a gimbal drive mechanism controlling the tracker optics.

17 Claims, 7 Drawing Sheets

FIG.3
BANG-BANG TRACKER COMPUTATION ALGORITHM

FIG. 7
ACCELERATING TARGET

BANG-BANG LASER SPOT TRACKER

BACKGROUND OF THE INVENTION

1. Field of the Invention

This invention relates to an acquisition and tracking system and more particularly to a digital tracking system for a remote laser designated target.

2. Description of the Prior Art

Target acquisition and tracking systems operable with optical energy devices are well known to those skilled in the art. The measure of the position of a laser designated target for example creates a complex problem due to target range and the characteristics of the laser transmitter which generates a low frequency pulse train of narrow optical pulses. An electro-optical system including a servo directed line of sight and quadrant detector are conventionally used in the respective of the target return pulses. Because the field of view of the system is relatively narrow, typically in the order to 2°–4°, a scanning technique must be utilized which is adapted to ensure that the laser spot falls within the field of view of the detector. Once the target is captured, a servo loop is adapted to respond to tracking error signals to follow the target and accordingly null the tracking error signals.

In typical prior art systems presently known, the measure of position error is proportional and requires a complex analog receiver due to the narrow pulse width of the return signals, the variation of pulse amplitude, and hence automatic gain control with range and noise fluctuations which become a significant factor because of the wide receiver bandwidths required. There inherent limitations have recently been overcome by the use of a digital or "bang-bang" tracker. These systems rather than using a proportional error, use only the algebraic sign of the error and create fixed amplitude servo control signals which force the tracker optics to oscillate in a "limit cycle" about a null error point, whereupon the sign of the error changes as the detector sweeps through the system null or boresight. The limit cycle amplitude, however, is normally quite large particularly for targets which have an apparent velocity in acceleration relative to the line of sight of the tracking system.

SUMMARY

This invention is directed to an improved method and apparatus in a digital laser spot tracker system which is adapted to reduce or increase the system gain, and accordingly the amplitude of the limit cycle in binary steps. Following two consecutive null crossings where the sign for consecutive detected return pulses alternate in sign, the amplitude of the previous limit cycle is reduced by one half. In addition an estimate of the velocity error is generated from the number of return pulses between successive zero crossings. This parameter is summed with the system gain reduction and causes a reduced composite tracking error signal to be generated which is then applied to a rate servo loop. In the event that the estimated velocity error exceeds a predetermined magnitude, the system responds by temporarily increasing the amplitude of the limit cycle until the target is recaptured whereupon a new reduction in the limit cycle is again provided as stated above. Operation is controlled in accordance with an algorithm incorporating binary digital logic which is implemented by means of a digital signal processor which is responsive to the sign (+ sign or – sign) of the error, resulting from respective elevation and azimuth gimbal mechanisms controlling the movement of laser spot tracker optics, e.g. a reflective mirror optically coupled to a quadrature detector whose outputs are adapted to provide the sign of the error relative to boresight along azimuth and elevation orthogonal axes.

DESCRIPTION OF THE PREFERRED EMBODIMENT

Prior to discussing the subject invention in detail, it should be pointed out that in a "bang-bang" type of tracker system, the limiting angular resolution is established by the system gain or equivalently by the preset magnitude of the digital error signal which controls the limit cycle or amplitude of the oscillation about a null error point. For systems which are not required to operate under conditions of target velocity and/or acceleration, a simple adaptive method of decreasing the gain every time the null is crossed provides a technique for rapid acquisition and smaller ultimate limit cycle as a result of decreasing the magnitude of the error signal. Thus relatively high acquisition slew rates are achievable. It is recognized in this invention, however, that a more general situation exists and must be considered if the system is to be capable of tracking a target with velocity and/or acceleration.

Accordingly, the present invention includes an estimated velocity parameter, to be described subsequently, which as long as the true velocity of the target minus the estimated velocity thereof in considerably less than the tracker slew rate, a temporary limit cycle will be provided in which there will be two successive null crossings. At this point, the magnitude of the subsequent error signals is decreased by a predetermined factor. The decrement is a binary step and more particularly, a step reduction of one half the amplitude of the previous error signal. Thus the present invention to be described determines the existence of two consecutive zero crossings together with a reversal of the sign of the error for consecutive detected returns and cuts the size of the limit cycle in half.

Figure 1:
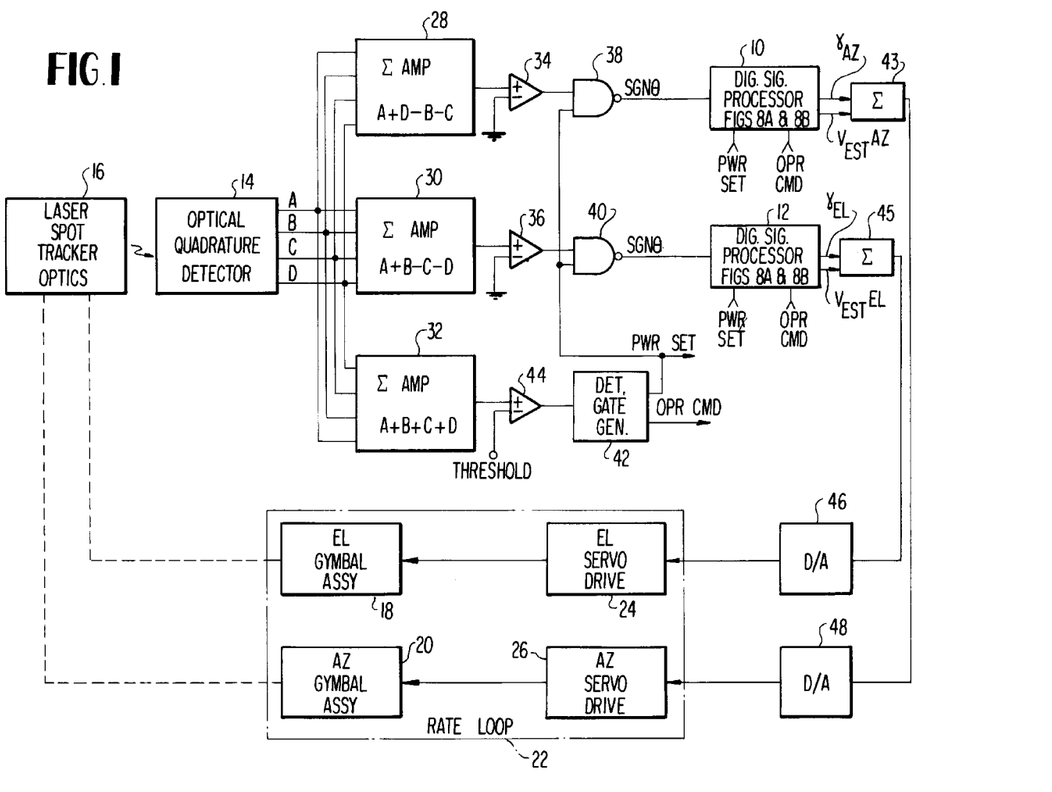
FIG. 1 is a schematic block diagram of a laser spot tracker system incorporating the subject invention.
Figure 3:
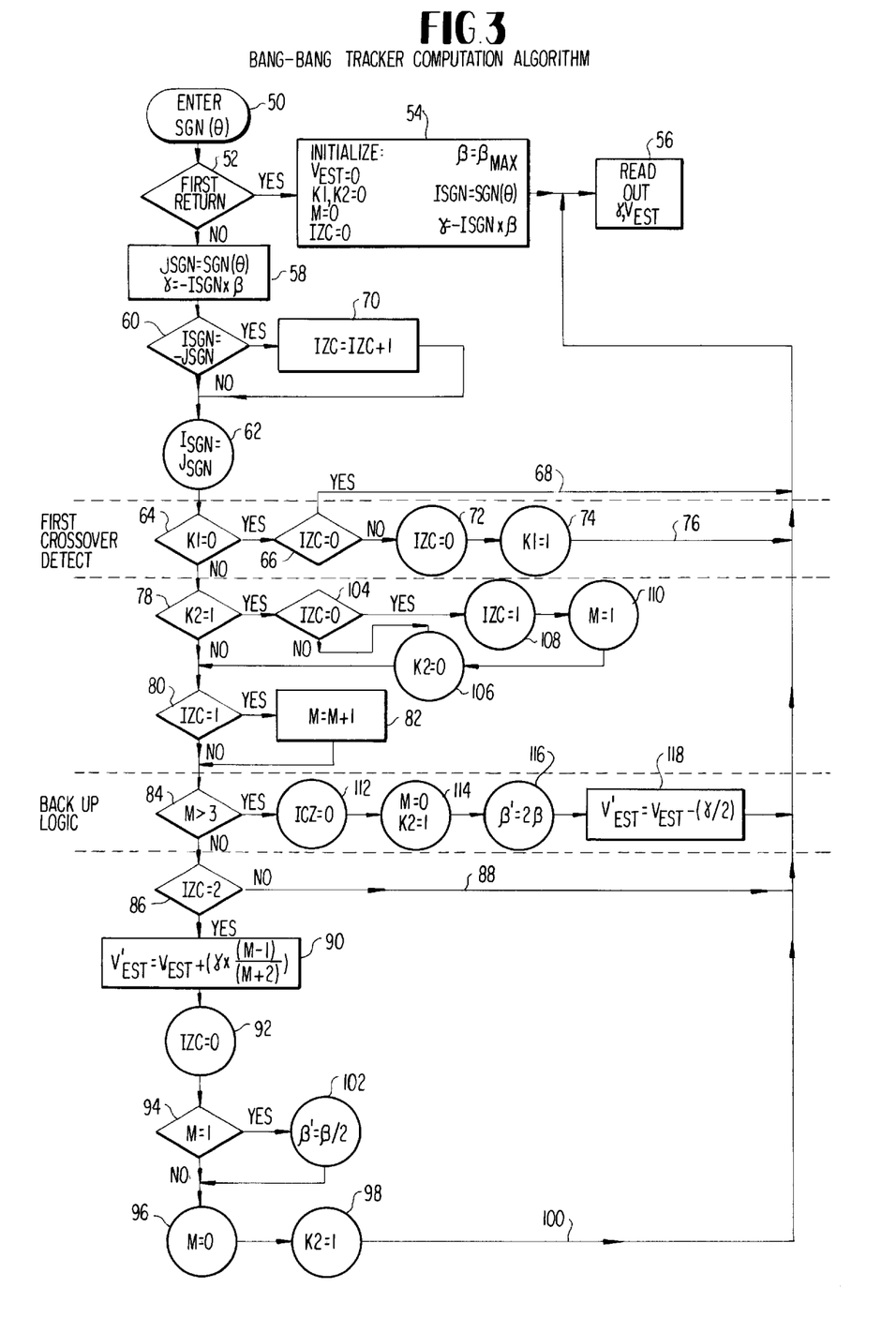
FIG. 3 is a logic flow chart illustrative of the computation algorithm performed in accordance with the teachings of the subject invention.

Referring now to FIG. 1, there is disclosed in block diagrammatic form, a laser spot tracking servo system which includes a pair of like digital logic signal processors 10 and 12, which embody the inventive concept of the subject invention and provide a means for performing the computation algorithm shown by the logic flow chart illustrated by FIG. 3. Both digital processors are identical and as shown schematically in detail in FIGS. 8A and 8B.

The system shown in FIG. 1 includes an optical quadrature detector 14, well known to those skilled in the art, which is responsive to light energy coupled thereto from a laser spot tracker optic assembly 16 which is adapted to be driven along elevation and azimuth orthogonal axes by means of respective gimbal assemblies 18 and 20 included in a rate loop 22, also incorporating respective servo drive circuits 24 and 25. As opposed to prior art systems, the present system is not responsive to the amplitude of the target return signals received at the quadrature detector 14, but of the sign (+ or −) of the signal error deviation from the tracker optics 16 line of sight, i.e. boresight, along the azimuth (right/left) and elevation (up/down) axes. The sign of the error (SGNθ) along the azimuth and elevation axes, is respectively fed to the digital processors 10 and 12 and derived from the four electrical outputs A, B, C and D whose amplitudes provide an indication of the amount of light energy falling on each of the four quadrants of the photoresponsive detector input.

The four output signals are fed to three summing amplifiers 28, 30 and 32 which respectively perform summations (A+D−B−C), (A+B−C−D) and (A+B+C+D). The summing amplifier 28 is thus adapted to indicate the horizontal signal error while summing amplifier 30 is adapted to provide the vertical signal error. The output of the summing amplifiers are fed to the (+) inputs of the comparator amplifiers 34 and 36, respectively, which have their (−) inputs coupled to a reference potential illustrated as ground. The outputs of the comparator amplifiers 34 and 36 are fed to one input of respective NAND logic gates 38 and 40, whose other inputs are coupled to a detector gate generator circuit 42 which is a one-shot circuit triggered in response to the output of summing amplifier 32. Amplifier 32 is adapted to operate as a level sense detector whose output is compared against a predetermined threshold by comparator amplifier 44. The outputs of the NAND gates 38 and 40 comprises a binary output wherein one output state corresponds to (+) which is defined to be up or right, while the opposite output state corresponds to a (−) which is down or left. The binary outputs from NAND gates 38 and 40 are respectively fed to the digital processors 10 and 12, which generate two digital control signals γ which is a system gain parameter corrected for SGNθ and $V_{est}$ which is the parameter of the target's estimated velocity. These signals for both the azimuth and elevation channels, are summed in summing circuits 43 and 45 whose outputs are fed to digital to analog converters 46 and 48. The converters' outputs correspond to elevation and azimuth error signals which are coupled to the servo drive circuits 24 and 26. The system is adaptive in that the magnitude of the limit cycle as determined by the elevation and azimuth position error signals applied to the rate loop 22 is changeable in response to target dynamics such as a change in velocity.

Figure 2:
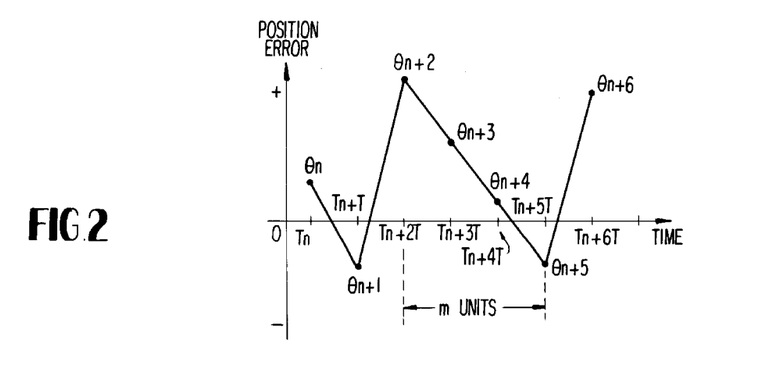
FIG. 2 is a timing diagram helpful in understanding the subject tracker system.

By reference to FIG. 2, which is a plot of the target's position error relative to boresight, the velocity estimate $V_{est}$ is developed in view of the following derivation where data is obtained at sample intervals of length T which is the period of the laser repetition rate and indicates the algebraic sign of the position error (+ or −) of successive detected returns. For a constant error velocity $V_E$ the position ramps between sample intervals according to the following expression $V_E = V - V_{est}$ where: V is equal to the target velocity and $V_{est}$ is the target velocity estimate in the nth interval.

If $\theta_n$ is defined as the target position at the nth interval, $V_s$ is the step velocity applied to a controller, T is the sample interval, and The function sgn(x) defined by:

$$sgn(x) = \begin{cases} 1, & x \geq 0 \\ -1, & x < 0 \end{cases}$$

the difference equation of position can be expressed as follows:

$$\theta_{n+1} = \theta_n + [V_E - Sgn(\theta_n)V_s]T \quad (1)$$

Assuming further that $$V_s > V_E > 0 \quad (2)$$

and that a plot of the position error is as shown in FIG. 2, the magnitude of the change in position in a sample interval is given by:

$$\left| \frac{\theta_{n+1} - \theta_n}{T} \right| = |V_E - Sgn(\theta_n)V_s| \quad (3)$$

Since the error $V_E$ is assumed positive, the magnitude of the position change is less for errors progressing from the positive side of the position error axis than from the negative side. Hence it may take many more than one sample interval for the position error to change sign. For the example in FIG. 2, three periods are required in going from a (+) to (−) position error during $T_n+2T$ to $T_n+5T$ while only one period is required in going from (−) to (+) errors. Accordingly, the number of periods between zero crossings can be used to estimate the velocity error $V_{est}$. Bounds on the error are determined by the following:

$$\theta_{n+1} = \alpha(V_E - V_s)T, \ 0 < \alpha < 1 \quad (4)$$

$$\theta_{n+2} = \theta_{n+1} + (V_E + V_s)T \quad (5)$$

$$\theta_{n+5} = \theta_{n+2} + m(V_E - V_s)T \quad (6)$$

$$\theta_{n+6} = \theta_{n+5} + (V_E + V_s)T \quad (7)$$

Combining equations (4), (5) and (6)

$$\theta_{n+5} = V_E(\alpha + m + 1)T - V_s(\alpha + m - 1)T \quad (8)$$

From equations (7) and (8)

$$\theta_{n+6} = V_E(\alpha + m + 2)T - V_s(\alpha + m - 2)T \quad (9)$$

Since $\theta_{n+5} < 0$, then $$V_E(\alpha + m + 1)T - V_s(\alpha + m - 1)T < 0 \quad (10)$$

$$V_E < V_s\left(\frac{\alpha + m - 1}{\alpha + m + 1}\right)$$

or

Also, since $\theta_{n+6} > 0$, then $$V_E(\alpha + m + 2)T - V_s(\alpha + m - 2)T > 0 \quad (11)$$

$$V_E < V_s\left(\frac{\alpha + m - 2}{\alpha + m + 2}\right)$$

or

Equations (10) and (11) and the bounds on α are combined to yield the following inequalities:

$$V_s\left(\frac{m-2}{m+2}\right) < V_s\left(\frac{\alpha+m-2}{\alpha+m+2}\right) < V_E < V_s\left(\frac{\alpha+m-1}{\alpha+m+1}\right) < V_s\left(\frac{m}{m+2}\right) \quad (12)$$

Finally, the estimate of $V_E$, i.e. $V_{est}$, is given by the mean of the greatest lower and least upper bounds:

$$V_{est} = 1\bigg/2\left[V_s\left(\frac{m-2}{m+2}\right) + V_s\left(\frac{m}{m+2}\right)\right] = V_s\left(\frac{m-1}{m+2}\right) \quad (13)$$

Suppose a sign change occurs in state n+m. Then the velocity estimate is given as $$V_{est} = V_n - Sgn(\theta_{n+m})V_s\left(\frac{m-1}{m+2}\right) \quad (14)$$

and thus the new error is $V_E=V-V_{est}$.

The change in the velocity estimate $V_{est}$ is thus proportional to the step velocity change $V_s$. Since the present invention is an adaptive system wherein the limit cycle decreases for small position and velocity errors, the velocity estimate $V_{est}$ approaches the true target velocity V. An iterative approach is established which nulls both the position and velocity errors and does so in a relatively few number of sample intervals, i.e. target return signals.

Further, in a dynamic situation in which relative target accelerations are realized, whether due to target or tracker maneuvers or the geometry of the tracking situation, the estimated velocity $V_{est}$ may come to be in serious error. The present invention is additionally adapted to recognize such a situation and initiate a larger limit cycle when an extended number of detected target return signals occur on one side of the zero crossing point. A "back up" mode is thus initiated and the step size is increased until a normal tracking situation is again established.

Figure 8A:
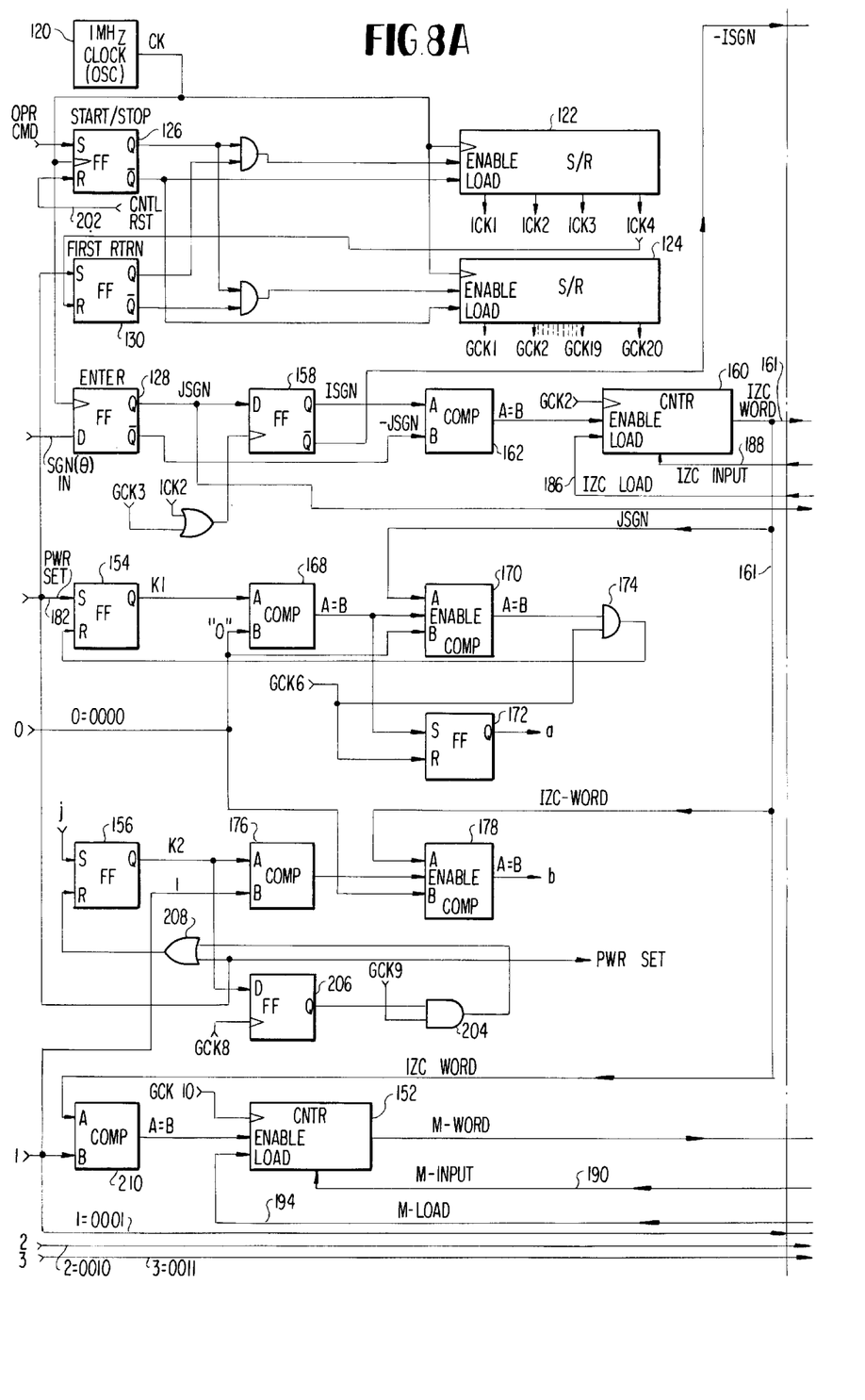
FIGS. 8A and 8B comprise an electrical schematic diagram illustrative of an embodiment of a digital processor adapted to implement the algorithm shown in FIG. 3.
Figure 8B:
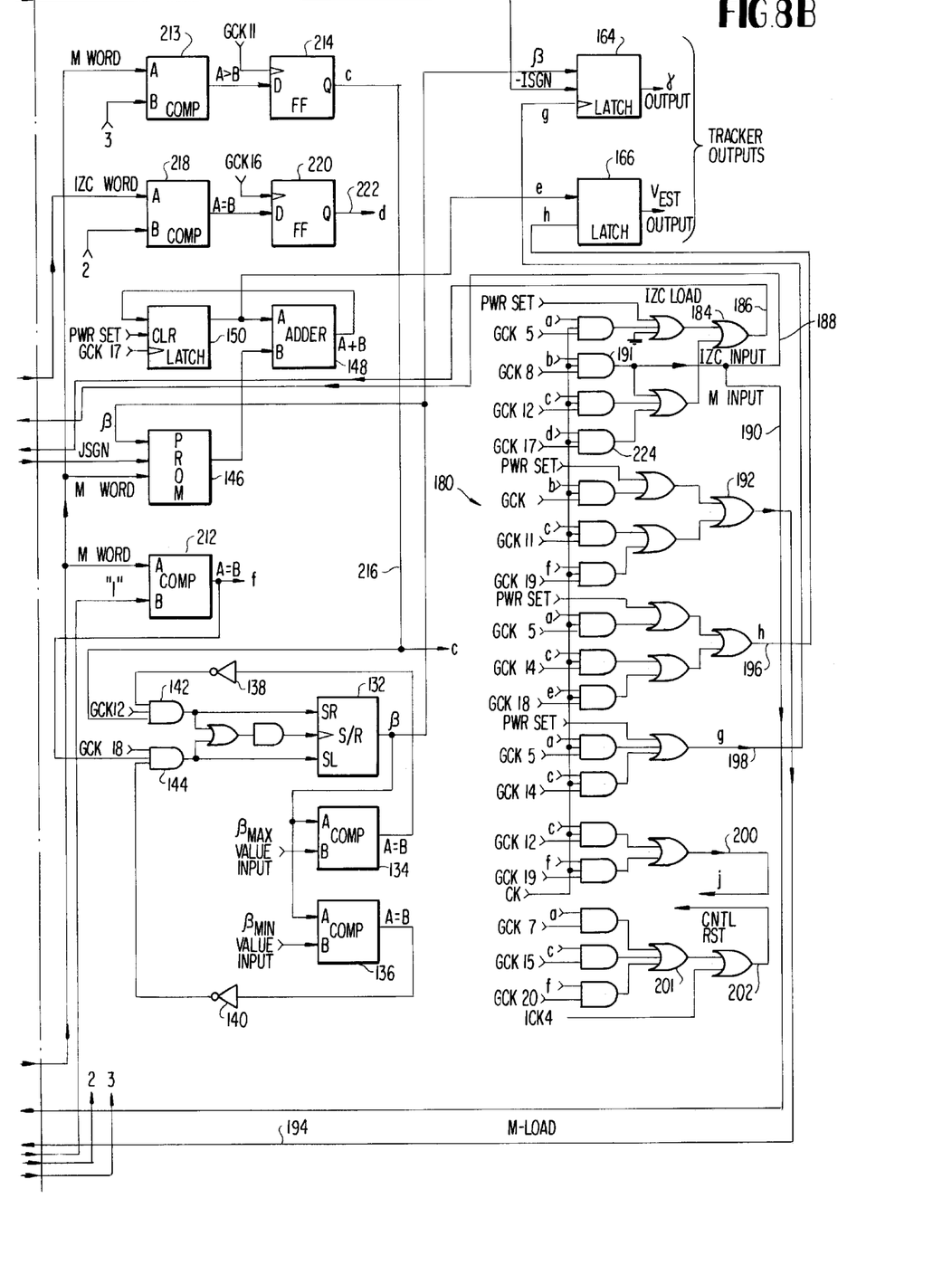

The aforementioned theory of operation is effected in the digital signal processors 10 and 12 which operate in accordance with the algorithm shown in FIG. 3. Referring now to FIG. 3, the algorithm expressed by the flow chart describes the computational method implemented in both the azimuthal and elevational channels as illustrated in FIG. 1, and which is implemented in an illustrative embodiment as shown in FIGS. 8A and 8B. Considering the algorithm for either of the azimuth or elevation channels, a functional block 50 is shown in FIG. 3 wherein the first step consists in entering a digital signal corresponding to the SGNθ, noted earlier, and which corresponds to the sign of the detected return signal, i.e. (+) for up or right and (−) for down or left. The (+) may be represented by a digital "1", while the (−) may be represented by a digital "0". The system is thus not responsive to amplitude at the received signal output of the quadrature detector 14 shown in FIG. 1, but to the sign of the error relative to the tracker optics' line of sight or boresight.

Figure 4:
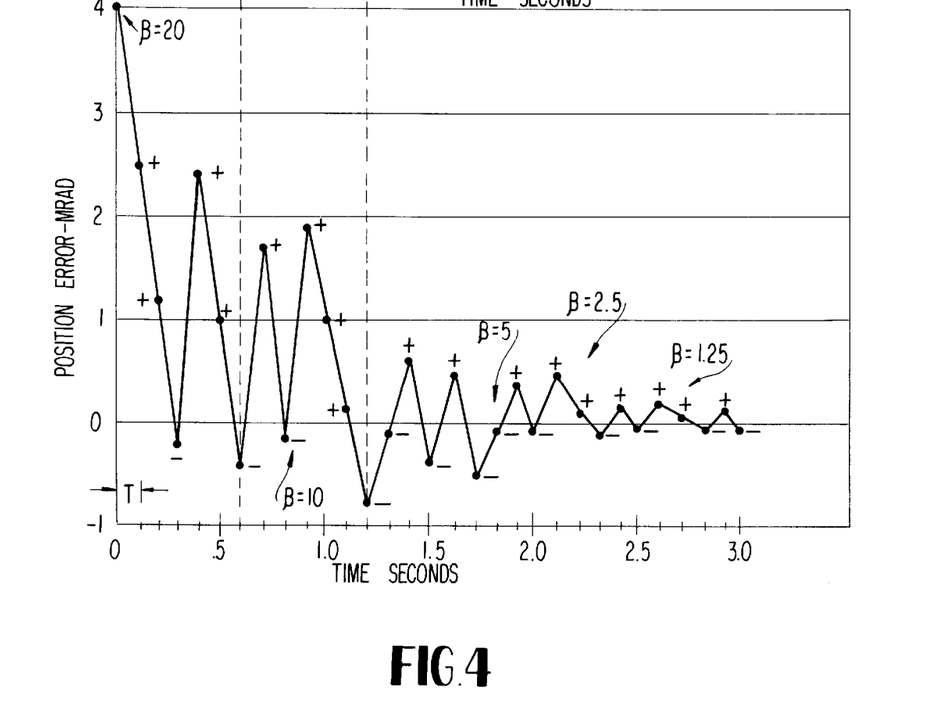
FIG. 4 is a time related diagram illustrative of the computational algorithm performed by the subject invention.
Figure 5:
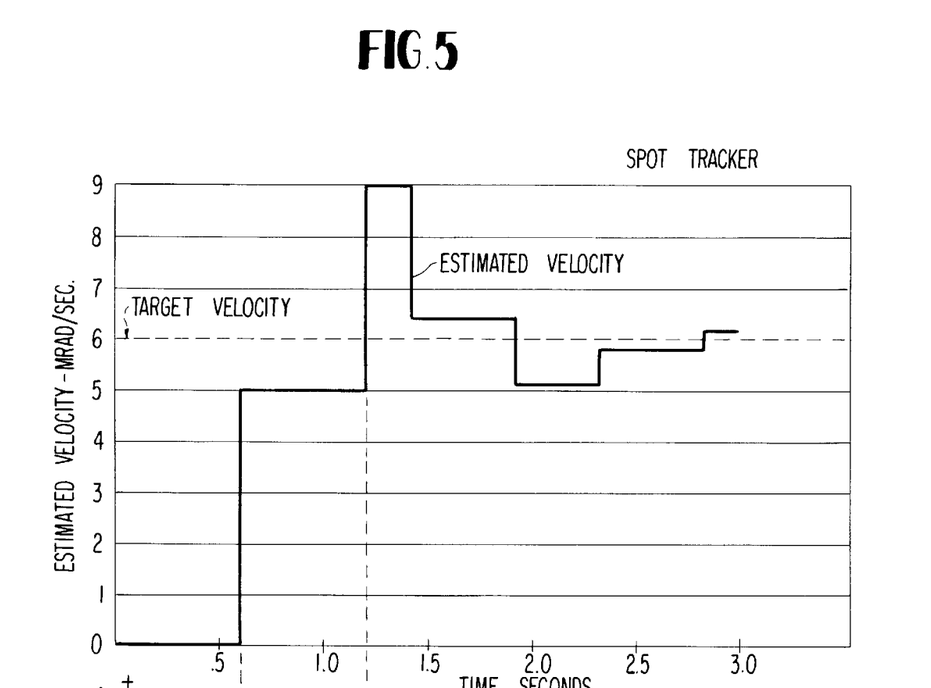
FIG. 5 is a time related diagram further illustrative of the computational algorithm as it pertains to estimated velocity for a constant velocity target.
Figure 6:
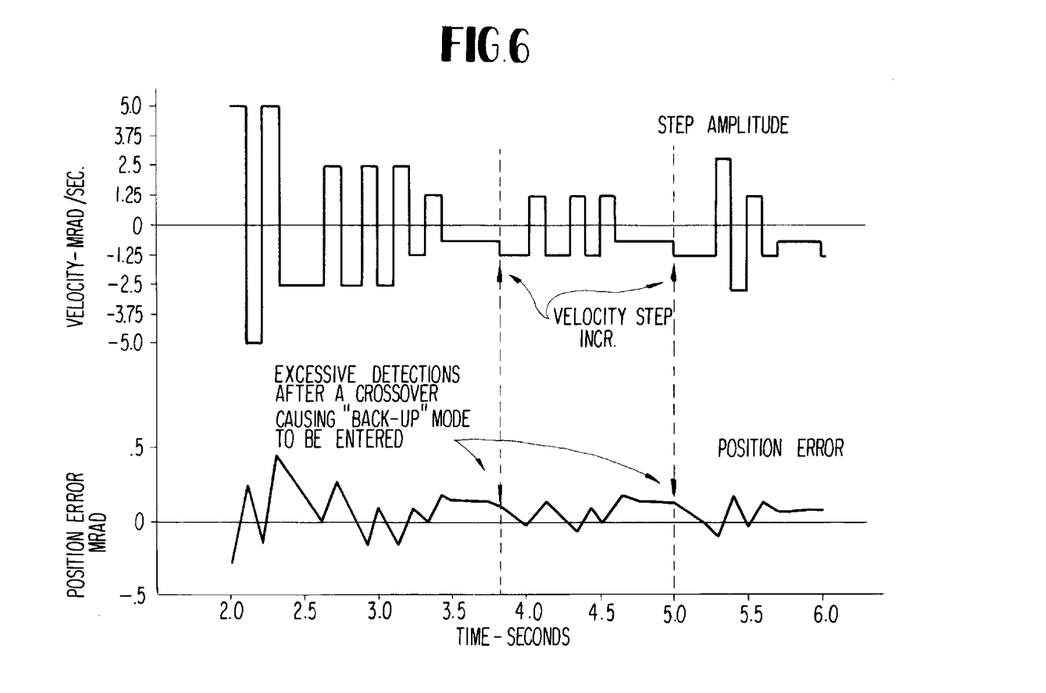
FIG. 6 is an expanded time related diagram of the algorithm.

The algorithm furthermore will be described with reference to FIGS. 4, 5 and 6, and particularly to FIG. 4, which depicts the target position error and sign (+ or −) relative to the zero position (boresight) over a 3.0 second period wherein the return signals are received in 0.1 second intervals. At T=0.0, receipt of the first signal notes a positional error of 4.0 milliradians (mrad) and constitutes the first target detection signal. A YES/NO decision function 52 is made which for the first signal detection comprises a YES, causing an initial set of parameters to be initialized as evidenced by functional block 54. System initialization from the first detected return signal comprises:

$V_{est}=0$; K1, K2=0; M=0; IZC=0; $\beta=\beta_{max}$; ISGN=SGNθ; and γ=−ISGN×β where:

$V_{est}$ is defined as the estimated target angular velocity relative to the tracking sensor line of sight (boresight);

K1 is defined as a bookkeeping function used to identify the first signal crossover, i.e. where the sign of the return signal goes from (+) to (−) or vice versa;

K2 is defined as a bookkeeping function used solely to determine that a limit cycle has been achieved and the tracker is accordingly keeping up with the target;

M is defined as a bookkeeping function that counts the number of signal returns following a zero crossover (or alternatively, the number of sequential detections since the target entered a given position of being (+) or (−);

β is defined as the desired system angular gain in milliradians per second and which determines the step amplitude of the limit cycle;

$\beta_{max}$ is defined as the maximum and initial value of β which for purpose of illustration of the subject invention, is shown as 20 milliradians per second in FIG. 4;

IZC is defined as the number of zero crossovers following a gain change in β;

ISGN is defined as a bookkeeping function preserving the sense of the initial SGNθ and the SGNθ=JSGN of immediately previous return of subsequent detected returns; and γ is defined as −JSGN×β which is the system angular gain corrected for the sign of SGNθ.

Accordingly, first return initializes a set of parameters which causes an initial value of $\gamma=-\beta_{max}$ and $V_{est}=0$ to be computed and read out of either digital signal processor 10 or 12 (FIG. 1) as evidenced by functional block 56. The γ has a negative sign due to the fact that SGNθ=+1 for the first detected return as shown in FIG. 4.

At the time T=0.1, a second laser pulse from the target is detected wherein the SGNθ=+1. The "first return" decision 52 now becomes NO and a processing step 58 is carried out whereupon the sign of the JSGN is made equal to the SGNθ, i.e. +1, and γ is made equal to −JSGN×β i.e. $-\beta_{max}$. Next a decision step 60 is made to determine if ISGN=−JSGN. For the second detection, the answer is NO whereupon the parameter ISGN=JSGN is set as evidenced by reference numeral 62. This having been done, a decision step 64 is next made to determine whether K1=0, as initially set, still exists, indicating that a first crossover has not occurred. Since the answer is YES, another decision 66 is made to determine whether IZC=0 which for the second detection pulse is YES, causing the answer signified by the line 68 to cause the computation and readout of $\gamma=-\beta_{max}$ and $V_{est}=0$.

For the third detected return signal which occurs at T=0.2, the same computation as noted above for the second detection again takes place wherein $\gamma=-\beta_{max}$ and $V_{est}=0$.

On the fourth detected return signal which occurs at T=0.3, the first zero crossover occurs and the SGNθ=−1. The JSGN now is set to −1, and γ is set to $+\beta_{max}$ as constrained by step 58. The decision step 60 provides a YES answer, whereupon IZC=IZC+1 is set by a step 70, causing IZC=1. Since $K_1=0$ is still set to 0, a YES output is provided; however, the decision step 66 output is NO, since IZC=1. This being the case, the IZC=0 is reset to 0 by step 72, and K1 is set to 1 by step 74 and will remain so. This being accomplished, a command signified by line 76 causes a computation to be made and read out of $\gamma=+\beta_{max}$ and $V_{est}=0$.

The fifth detected return occurring at T=0.4, constitutes a second zero crossover whereupon SGNθ=+1. This is a change of sign from the immediately preceding detection. Accordingly, step 58 makes JSGN=+1 and $\gamma=-\beta_{max}$. Since the ISGN=−1 from the previous detection step 70 makes IZC=1. Since K1=1 has been set by step 74 in the previous detected return, the decision step 64 provides a NO answer, whereupon a decision step 78 of K2=1 exists. Since in the instant detection the answer is NO and a decision step 80 is initiated to determine if a crossover has occurred, i.e. IZC=0. Since the answer is YES, M is set to 1 by means of a step 82 wherein M=0+1=1.

Next a decision step 84 for a backup logic procedure, which will be explained subsequently, is querried, the question of whether or not M is greater than 3. Since in the instant case the answer is NO, a decision step 86 of IZC=2 exists. Since IZC=1, the answer is NO and a command represented by line 88 causes a computation and readout of $\gamma = -\beta_{max}$ and $V_{est} = 0$.

The return at T=0.5 contains no crossover and thus the decision step 60 answer is NO in the same procedure as outlined for the received pulse for T−0.4 is repeated with the exception that M is incremented to M=2 in step 82.

At T−0.6 seconds, a third zero crossover occurs, whereupon SGNθ is a −1, causing a JSGN=−1 and $\gamma=\beta_{max}$. The step 70, however, causes the IZC to increment to a numeral 2, whereupon decision step 86, IZC=2, provides a YES output instigating a step 90 to be carried out whereupon a new estimated velocity $$V'_{est} = V_{est} + \left(\gamma \times \frac{M-1}{M+2}\right)$$

is calculated. Since the previous $V_{est}$ was 0 and M=2, the new or $V'_{est} = \frac{1}{4}\beta_{max}$. Following this, the IZC is reset to 0 by step 92. A decisional step 94 of M=1 is made and since in the instant return pulse M=2, the output answer is NO and whereupon M is reset to 0 by step 96. Following this, K2=1 is set by step 98 whereupon a command signified by line 100 causes a readout of $\gamma=\beta_{max}$ and a $V_{est}=\frac{1}{4}\beta_{max}$ which for a $\beta_{max}=20$ mrad/sec results in a $V_{est}=5$ mrad/sec, which is shown by the graph of FIG. 5. For the first time a velocity estimate has been calculated following the first zero crossover, and is calculated from the number of detections following the first and second crossover thereafter.

At T=0.7, another crossover occurs wherein SGNθ=+1. Since by means of step 92 the previous pulse IZC was reset to zero, step 70 now makes IZC= to 1 and step 82 increments M to 1, since by step 96 M had been reset to zero by step 96. Accordingly, $V'_{est}=\frac{1}{4}\beta_{max}=5$ mrad/sec and $\gamma=-\beta_{max}=20$ mrad/sec.

When the next detection occurs at T=0.8 seconds, another crossover occurs and as a result IZC is incremented to 2, which causes step 90 to be repeated. Since M=1, $$V'_{est} = \frac{1}{4}\beta_{max} + \beta_{max}\left(\frac{1-1}{1-2}\right) = \frac{1}{4}\beta_{max},$$

which is the existing value; however, since only one return, i.e. M=1 exists for two consecutive zero crossovers, IZC=2, decision step 94 provides a YES output, causing a step 102 to be initiated, whereupon β is reduced by a factor of 2, i.e. β'=β/2, whereupon the amplitude of the limit cycle, that is the system angular gain, is reduced and accordingly a $$\gamma = \beta_{\frac{max}{2}} = 10$$

10 is read out together with a $V_{est}=\frac{1}{4}\beta_{max}=5$ mrad/sec. Thus a condition exists where two zero crossovers occur for consecutive pulses, i.e. M=1, and the size of the gimbal step for the tracker is cut in half.

The remainder of the tracker operation is similar, consisting of detecting IZC−2, counting the detections M=1, 2, or 3 after a crossover and accordingly reestimating $V_{est}$ and reducing system gain β whenever the condition IZC=2, M=1 exists.

The detected return at T=0.9 consists in yet another crossover wherein SGNθ=+1. The decision step 78 in this instance, however, provides a YES decision, whereupon a decision step 104 is instigated for the decision IZC=0. The answer to this situation consists in a NO, whereupon a step 106 is initiated, setting a K2 to 0. Since step 96 of the previous time T=0.8 sets M to 0, step 82 now makes M=1 causing decision step 84 to provide a NO answer which in connection with step 86 provides a NO. A readout of $V_{est}=\frac{1}{4}\beta_{max}$ and $\gamma=-\frac{1}{2}\beta_{max}$ is generated via step 56.

At T=1.2, a new $V_{est}$ is provided by step 90, whereupon $$V_{est} = \frac{1}{4}\beta_{max} + \frac{1}{2}\beta_{max}\left(\frac{3-1}{3+2}\right) = .45\,\beta_{max}$$

is calculated and read out in step 56 together with a $\gamma=\frac{1}{2}\beta_{max}$. At T=1.3 seconds, no crossover occurs and SGNθ remains −1. In this instance, decision steps 78 and 104 both provide YES answers, whereupon IZC is set to 1 by step 108 and M is set to a numeral 1 by step 110 and step 106 is repeated, setting K2 to zero once again. The decisional element 86 again provides a NO answer, whereupon step 56 provides a $V_{est}=0.45\beta_{max}$ and $\gamma=\frac{1}{2}\beta_{max}$. A gain change β does not occur again until the time T=1.8, whereupon in accordance with the algorithm, a $V_{est}=3.25\beta_{max}$ is provided together with a γ of $\frac{1}{4}\beta_{max}$.

In the event that $V_{est}$ is in serious error, for example where four detections follow a given crossover such that IZC=1, M=4, indicative that the target is accelerating, the algorithm shown in FIG. 3 enters a "back up" mode in which the step amplitude of the limit cycle reflected in system gain β is increased. This is illustrated in the expanded time scale of the graphs of FIG. 6 in relation to that shown with respect to FIGS. 4 and 5. Note in FIG. 6 the time corresponding to T=3.8 seconds and T=5.0 seconds. There the step amplitude is doubled. This is illustrated in the algorithm flow chart shown in FIG. 3, whereupon the decision step 84 of M>3 provides a YES output. IZC is accordingly set to 0 in the step 112, a step 114 is initiated whereupon M is set to 0 and K2 is set to 1 and more significantly, a new β i.e. β' is generated equal to 2β in step 116. In addition, the $V_{est}$ is reestimated in a step 118 according to the expression $V'_{est}=V_{est}-(\gamma/2)$. This process of increasing the system gain and reestimating the $V_{est}$ will occur periodically until target is recaptured as determined by IZC.

Figure 7:
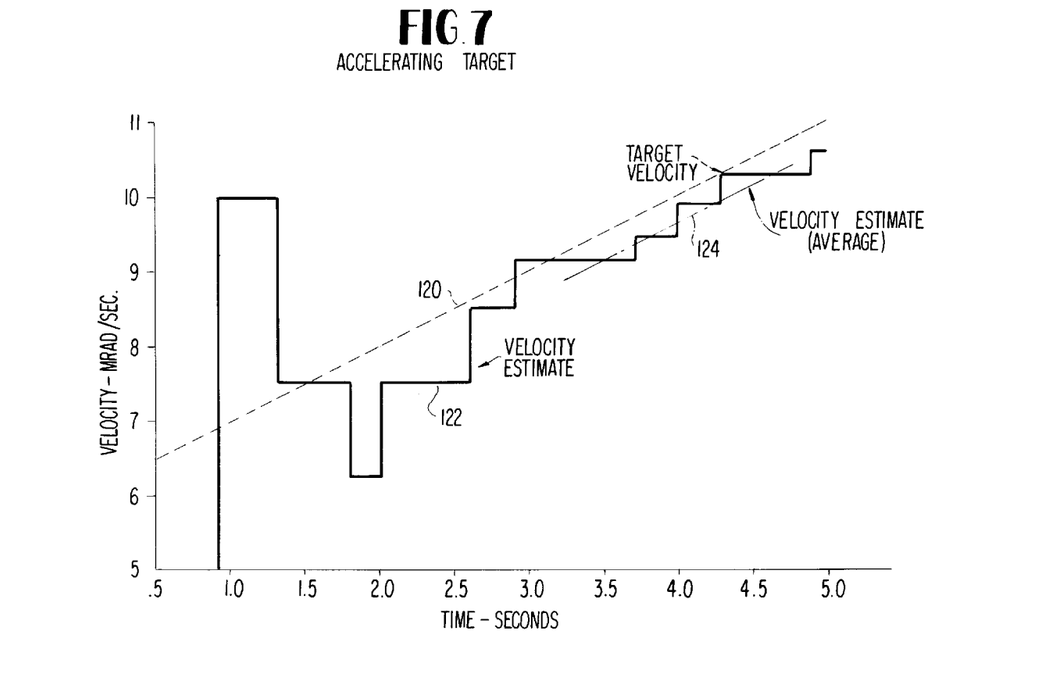
FIG. 7 is a time related diagram illustrative of the operation of the subject invention for an accelerated target as it pertains to the estimated velocity of the computation performed by the subject invention.

Referring now to FIG. 7, there is disclosed a time history of the present invention operating in accordance with the computation algorithm flow chart shown in FIG. 3 for an accelerating target. The line 120 illustrates the true target velocity when subjected to a constant acceleration. The non-uniform stepped response is the value of $V_{est}$ generated in accordance with the algorithm as evidenced by the graph 122. The line 124 denotes the average velocity estimate. It is shown to lag behind the true target velocity by a predetermined amount. This is an inherent feature of the subject invention.

Turning attention now to FIGS. 8A and 8B, there is disclosed an illustrative embodiment of an implementation of a digital signal processor denoted by reference numerals 10 and 12 shown in FIG. 1, which is adapted to operate in accordance with the algorithm shown by the flow chart of FIG. 3. The embodiment, moreover, is comprised of conventional well known digital logic circuit elements, which in addition to flip-flops, AND gates, and OR gates, include: comparators (COMP) which takes two logic words A and B and indicates whether A<B, A=B, or A>B; counters (CNTR) which consists of an arrangement of flip-flops capable of counting digital signals; shift registers (S/R) which consist of an arrangement of flip-flops capable of holding a binary array of numbers and adapted to shift them left or right upon command; latches (LATCH) which is an assembly of D type flip-flops capable of storing an entire digital word on demand; and a programmable read only memory (PROM), which is a device capable of holding an array of words that may be addressed and recalled by appropriate inputs.

Figure 9:
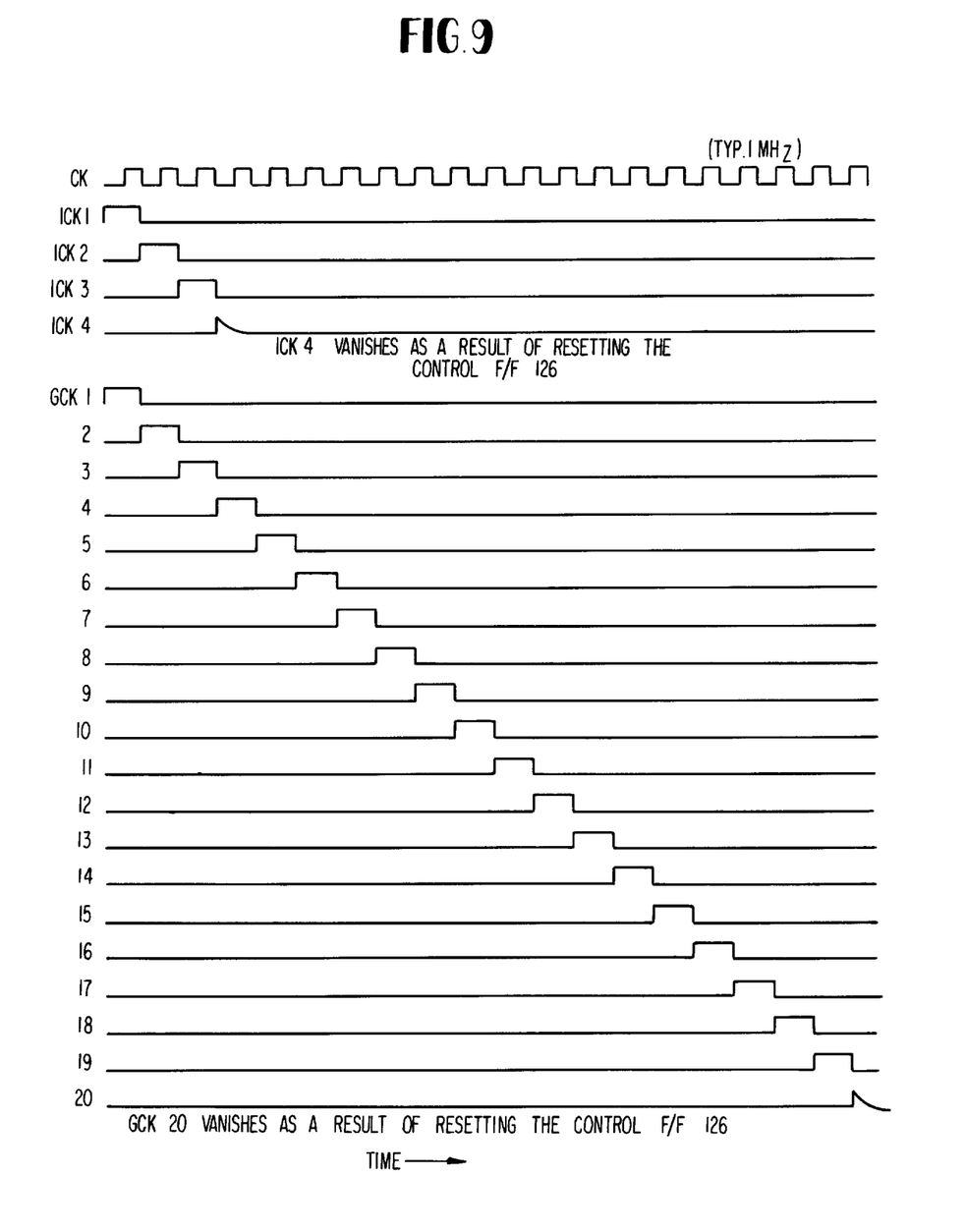
FIG. 9 is a diagram illustrative of the time related waveforms of the signals for controlling the operation of the digital processor shown in FIGS. 4A and 4B.

Considering now the embodiment shown in FIGS. 8A and 8B, the signal processor operates in accordance with a synchronous set of timing control signals shown in FIG. 9 developed from a master clock oscillator 120 (FIG. 8A) which is adapted to provide a pulse train, typically having a frequency of 1 MHz, and identified as CK. The CK clock is fed to a pair of shift registers 122 and 124 which respectively produce control signals 1CK1 . . . 1CK4 and GCK1 . . . CGK20.

The timing signals as shown in FIG. 9 permit whatever functions that are controlled by them to only operate when the respective timing signals are in a high or logic "1" state. In this manner an orderly and routine processing of the algorithm through the computational apparatus shown, independent of the decisions and operations being performed in accordance with the execution of the algorithm, is achieved. A START/STOP flip-flop 126 triggered initially by an operate command signal from gate generator 42 (FIG. 1) also receives a master clock signal CK as does an ENTER flip-flop 128, the latter being adapted to receive a digital input corresponding to the sign of the error signal i.e. SGNθ. The flip-flop 128 thus implements the step 50 of the flow chart shown in FIG. 3. Step 52, which comprises the decision of whether or not a first return exists is implemented by a third flip-flop 130 and acts in combination with the START/STOP flip-flop to enable and load the shift registers 122 and 124.

The parameter β is computed by means of a shift register 132 shown in FIG. 8B in combination with a pair of comparators 134 and 136 which are adapted to respectfully receive as one input a digital value of a predetermined $\beta_{max}$ and $\beta_{min}$. The other input is the calculated β. The output of comparators 134 and 136 is coupled to the β shift register 132 by means of logic inverters 138 and 140 which feed into respective AND gates 142 and 144. The parameter $V_{est}$ is implemented by means of a programmable read only memory (PROM) 146 an adder 148, and a latch 150 shown in FIG. 8B. The PROM 146 receives a digital word corresponding to β, a digital word corresponding to JSGN, which is developed at the Q output of the ENTER flip-flop 128 shown in FIG. 8A and an M word applied from counter 152 shown in FIG. 8A. The parameters K1 and K2 are implemented by a pair of flip-flops 154 and 156 and their respective Q outputs as shown in FIG. 8A. The parameter ISGN is provided at the Q output of flip-flop 158, whose D input is coupled to the Q output of the ENTER flip-flop 128. The parameter IZC comprises a digital word outputted from a counter 160 which is enabled by the output of a comparator 162, which is adapted to implement the decision step 60 shown in FIG. 3, i.e. ISGN=−JSGN. The parameter γ, is as noted above, developed from the terms −JSGN and β. These terms exist at the $\overline{Q}$ output of flip-flop 158 (FIG. 8A) and the shift register 132 (FIG. 8B). They are combined and outputted in a latch circuit 164 shown in FIG. 8B. The term $V_{est}$ is also outputted from a second latch 166.

Thus the algorithm step 58 shown in FIG. 3 is implemented by means of the Q output of flip-flop 128 and the latch 164. The decision step 60 i.e. that of ISGN=−JSGN is provided by the comparator 162. The counter 160 performs the algorithm step 70. The step 62 in effect is performed by the operation of the flip-flop 168.

The algorithm step 64 which determines the first crossover is implemented by a comparator 168 shown in FIG. 8A, which has the number "0" applied thereto in binary notation (0000) along with parameter K1 from flip-flop 154. The decision step 66 is implemented by means of a comparator 170, which has the ENABLE input coupled from the output of comparator 168 while the A input is coupled to the IZC word from the counter 160 and the B input comprises the number "0". The algorithm step 72 is implemented by means of a flip-flop 172 and whereas step 74 is implemented by means of an AND gate 174 which has its output coupled back to the R input of flip-flop 154.

The decisional step 78 of the algorithm shown in FIG. 3 is implemented by means of comparator circuit 176 which is adapted to receive the number "1" in binary notation (0001) at its B input, whereas the A input corresponds to the signal K2 coupled from the flip-flop 156. The decision step 104 is implemented by means of the comparator circuit 178 enabled by the operation of the comparator circuit 176.

It should be pointed out that the Q output of flip-flop 172 and the comparator 178 provide respective output signals labeled a and b, which are fed, inter alia, to a combinatorial network 180, shown in FIG. 8B comprising a plurality of AND gates, NOR gates which are adapted to operate in combination with selected GCK signals from the shift register 124, the CK clock signal from the clock oscillator 120, a power set (PWR SET) signal applied to signal buss 182 and control signals a, b . . . f to generate enabling signals at appropriate times for carrying out the computation algorithm. The combinatorial network 180 acts to provide an IZC load signal at the output of NOR gate 184 on signal buss 186 which is fed to the counter 160 (FIG. 8A) which additionally receives an IZC input signal and an M input signal on lines 188 and 190 respectively developed as the output of AND gate 191 and which are applied separately to the counter 160 and counter 152 as shown in FIG. 8A. An M load signal is outputted from the NOR gate 192 on circuit buss 194 which is applied back to the counter 152. Additionally, the combinatorial network provides output control signals of h, g and j on lines 196, 198 and 200. Lines 196 and 198 are applied to the latches 164 and 166 while line 200 is coupled back to the S input of the flip-flop 166. A combinatorial network 180 also provides a control reset (CNTL RST) signal from NOR gate 201 on circuit buss 202 which is applied back to the R input of the START/STOP flip-flop 126.

Referring back to FIG. 8A, an AND gate 204 in combination with a flip-flop 206 and a NOR gate 208 whose output is coupled to the K2 flip-flop 156 implements the step 106 shown in FIG. 3. The decisional step 80 of whether or not IZC=1 is provided by a comparator circuit 210 which receives as one input the IZC digital word from the counter 160 on line 161 and a binary number corresponding to the numeral "1". The counting step of step 82 is provided by the counter 152.

A decisional step indicative of whether or not M=1 is provided by a comparator 212 shown in FIG. 8B, which receives the M word at the A input and the number 1 in digital notation at its B input and provides the control signal f at its output. The comparator circuit 212 thus effectively implements step 94 shown in FIG. 3.

The "back up" mode logic includes a decisional step 84 concerning whether or not M>3. This is implemented by means of a comparator circuit 213 shown in FIG. 8B which receives at the A input a digital signal corresponding to the M word and a binary notation (0011) for the number "3". The comparator output is fed to a flip-flop circuit 214 which provides at its Q output a control signal c on circuit buss 216 which is fed to the combinatorial network 180 and AND gate 142 which causes the parameter setting steps 112, 114 and 116 to be initiated whereupon a new β is computed and as a result thereof, a new $V_{est}$ computed in accordance with step 118.

The decisional step 86 as to whether or not two zero crossings, i.e. IZC=2 have taken place following the first crossover, whereupon the $V_{est}$ step 90 is carried out as well as the reduction of β in step 102 if M=1, is implemented by means of a comparator circuit 218 shown in FIG. 8B which has for one of its inputs at A an IZC word appearing on buss 161 applied from the counter 160 and the numeral "2" in binary notation (0010) applied to its B input. The output of the comparator 218 is fed to a flip-flop 220 which provides a control signal d on signal buss 222 which is coupled to the AND gate 224 which is utilized to generate the IZC load signal outputted on buss 186 in the event that IZC=2.

Thus what has been shown and described is an adaptive signal laser spot tracker system which is responsive to the algebraic sign of the positional error signal with respect to boresight as sensed by an optical quadrature detector assembly to sum periodically calculated values of γ and $V_{est}$ and generate tracking error signals therefrom for both the elevation and azimuth channels which are adapted to change the amplitude of limit cycle and thus drive the laser spot tracker optics in such a way as to reduce the error until a null error point is achieved.

Having thus described what is at present considered to be the preferred method and embodiment of practicing the subject invention, We claim:

1. A method of generating an adaptive tracking error signal in response to detected changes in the algebraic sign of the positional error signal output from an optical detector in response to detected optical return signals in a bang-bang type of optical tracking system, comprising the steps of:

initializing a predetermined maximum system gain signal in response to the first return signal for establishing a predetermined limit cycle amplitude of the deviation of the system's scanning optics from a selected line of sight;

establishing an algebraic sign (+ or −) for either side of said line of sight relative to a predetermined scanning axis for said first return signal and each return signal thereafter;

determining an initial zero crossover of the scanning optics relative to said line of sight as indicated by a change of said algebraic sign;

determining the algebraic sign of the error signal resulting from the initial zero crossover;

generating an initial tracking error signal in response to the maximum system gain signal but opposite in algebraic sign from the initial zero crossover;

thereafter generating a gain signal for each return signal and having an algebraic sign opposite that of the preceding zero crossover;

generating an estimated velocity signal for each target detection in response to the magnitude of the gain and the algebraic sign of a predetermined number of successive return signals; and summing said estimated velocity signal with said gain signal to provide the respective tracking error signals from each return signal.

2. The method as defined by claim 1 wherein said step of generating said gain signal includes reducing the magnitude of said gain signal by a predetermined factor in response to a predetermined number of zero crossovers for consecutive return signals.

3. The method as defined by claim 2 wherein reducing the magnitude of said gain signal occurs following two zero crossovers following the initial zero crossover.

4. The method as defined by claim 3 where reducing the magnitude of said gain signal comprises reducing said magnitude by a factor of one half.

5. The method as defined by claim 1 wherein said step of generating the estimated velocity signal is made in response to the number of detected return signals between successive zero crossovers after two consecutive zero crossings occur following a system gain signal change.

6. The method as defined by claim 4 and additionally including the step of increasing the magnitude of said gain signal by a predetermined factor in response to a predetermined number of detected return signals between successive zero crossovers.

7. The method as defined by claim 6 wherein the step of increasing the magnitude of the gain signal comprises increasing the magnitude of the gain signal by a factor of 2 where there are greater than three detected return signals between successive zero crossovers.

8. The method as defined by claim 6 and wherein said step of generating said estimated velocity signal is made in response to the number of detected return signals between successive zero crossovers after two consecutive zero crossings occur following a system gain signal change.

9. The method as defined by claim 2 wherein the estimated velocity signal is determined by the expression:

$$V_{est}^1 = V_{est} + \left(\gamma \times \frac{(M-1)}{(M+2)}\right)$$

is the estimated velocity for the preceding target detection, γ is the magnitude of the gain signal for the preceding target detection, and M is the number of detected return signals following a selected zero crossover.

10. The method as defined by claim 9 wherein the estimated velocity is determined by the expression:

$$V_{est}^1 = V_{est} - \left(\frac{\gamma}{2}\right).$$

11. The method as defined by claim 10 wherein M is a predetermined number greater than three.

12. In an adaptive digital optical tracking system having optical tracker means operated in accordance with control signals applied thereto from a servo loop having tracking error signals applied thereto in accordance with the signal output from optical detector means in turn responsive to optical signals returned from a target, said optical signals being directed to said detector means from said optical tracker means, the improvement comprising:

means coupled to the signal output from said optical detector means and being operable to provide a signal corresponding to the algebraic sign (+ or −) of said optical signals relative to the tracker means' line of sight;

circuit means coupled to said signal corresponding to said algebraic sign to provide a binary digital signal representation thereof;

digital signal processor means coupled to and responsive to said binary digital signal for each detected return signal to selectively generate a first digital signal corresponding to a predetermined variable system gain which is adapted to control the amplitude of the limit cycle of the movement of said tracker means and a second digital signal corresponding to an estimated target velocity error;

summing circuit means coupled to said signal processor means and being responsive to said first and second digital signal generated thereby and providing therefrom a composite digital tracking error signal as an output; and digital to analog signal converter means coupled to said composite digital tracking error signal and being operable to generate an analog tracking error signal which is applied to said servo loop for controlling said optical tracker means.

13. The system as defined by claim 12 wherein said digital signal processor means includes first circuit means responsive to said binary digital signal corresponding to the algebraic sign for determining the first zero crossover of said line of sight by said optical tracker means as indicated by a change in said algebraic sign and providing a first control signal in accordance therewith;

second circuit means responsive to said first control signal and successive binary digital signals for determining two consecutive zero crossovers following said first crossover wherein the algebraic sign alternates are each consecutive detected return signal and providing a second control signal to reduce the value of said first digital signal by a predetermined factor; and third circuit means responsive to said first control signal and successive binary digital signals to determine the number of return pulses between successive zero crossings and accordingly vary the value of said second digital signal.

14. The system as defined by claim 13 wherein said digital signal processor means additionally includes:

fourth circuit means responsive to said first control signal and successive binary digital signals to determine the number of detected return signals between zero crossovers and in the event said number exceeds a predetermined number, causes the value of said first digital signal to increase by a predetermined factor.

15. The system as defined by claim 14 wherein the value of said first digital signal is selectively reduced and increased by a factor $\beta/2$ and $2\beta$, respectively, wherein $\beta$ is defined as the system gain, and wherein the value of said second digital signal is determined by the following relationship when said first digital signal is reduced:

$$V_{est}^1 = V_{est} + \left(\gamma \times \frac{(M-1)}{(M+2)}\right),$$

by the following relationship when said first digital signal is increased:

$$V_{est} = V_{est} - (\gamma/2)$$

wherein $V_{est}$ is the preceding estimate of the target velocity error, $\gamma$ is equal to $\beta$ times the opposite algebraic sign of the received signal, and M is the number of detected return signals following a selected zero crossover.

16. The system as defined by claim 13 wherein said signal processor means additionally includes circuit means for determining the occurrence of the first detected return signal; and additionally including circuit means operable in response to the first return signal to provide a predetermined maximum value of said first digital and a predetermined minimum value of said second digital signal.

17. The system as defined by claim 12 wherein said optical detector means comprises a quadrant detector providing four separate electrical output signals therefrom in accordance with the amount of optical energy falling in each of the four quadrants thereof; and wherein said means coupled to the signal output from said optical detector means provides a signal corresponding to the algebraic sign (+ or −) for two orthogonal axes wherein the tracker means line of sight constitutes the origin of said axes; and wherein said signal processor means is operable to provide first and second digital signals for both said axes, whereupon tracking error signals for both axes are applied to said servo loop.

* * * * *